(12) United States Patent
Seitz et al.

(10) Patent No.: US 12,080,921 B2
(45) Date of Patent: Sep. 3, 2024

(54) DISTRIBUTOR STRUCTURE FOR A FUEL CELL OR ELECTROLYSER

(71) Applicant: Robert Bosch GmbH, Stuttgart (DE)

(72) Inventors: Rainer Seitz, Vaihingen Enz (DE);
Achim Eisemann, Neuenstadt (DE);
Alexander Eifert, Friolzheim (DE);
Andre Neidhardt, Ludwigsburg (DE);
Arne Stephen Fischer, Leinfelden-Echterdingen (DE);
Christoph Haluschka, Strullendorf (DE); Felix Wald, Stuttgart (DE);
Friedrich Kneule, Rutesheim (DE);
Jan Hendrik Ohs, Renningen (DE);
Laszlo Hagymasi, Gerlingen (DE);
Laura Bauer, Altendorf (DE); Rolf Lernbecher, Wiernsheim (DE); Stefan Grosse, Gerlingen (DE); Stefan Schoenbauer, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 621 days.

(21) Appl. No.: 17/297,044

(22) PCT Filed: Nov. 28, 2019

(86) PCT No.: PCT/EP2019/082830
§ 371 (c)(1),
(2) Date: May 26, 2021

(87) PCT Pub. No.: WO2020/109436
PCT Pub. Date: Jun. 4, 2020

(65) Prior Publication Data
US 2022/0029175 A1 Jan. 27, 2022

(30) Foreign Application Priority Data
Nov. 28, 2018 (DE) ...................... 10 2018 220 464.0

(51) Int. Cl.
*H01M 8/0258* (2016.01)
*C25B 1/04* (2021.01)
(Continued)

(52) U.S. Cl.
CPC ............. *H01M 8/0258* (2013.01); *C25B 1/04* (2013.01); *C25B 9/07* (2021.01); *H01M 8/0226* (2013.01); *H01M 2008/1095* (2013.01)

(58) Field of Classification Search
None
See application file for complete search history.

(56) References Cited

U.S. PATENT DOCUMENTS

| 5,863,671 A | * | 1/1999 | Spear, Jr. | ............... F28D 9/0075 429/465 |
| 2003/0198857 A1 | * | 10/2003 | McManus | ........... H01M 8/0228 429/514 |

(Continued)

FOREIGN PATENT DOCUMENTS

| CN | 1770531 A | * | 5/2006 | .......... H01M 8/0258 |
| CN | 101043078 A | | 9/2007 | |

(Continued)

OTHER PUBLICATIONS

Abstract Translation of CN 1770531 A (Year: 2006).*

(Continued)

*Primary Examiner* — Kevin M Bernatz
(74) *Attorney, Agent, or Firm* — Michael Best & Friedrich LLP

(57) ABSTRACT

The invention relates to a distributor structure (12, 20), particularly a bipolar plate for a stack structure (10) of a fuel cell or of an electrolyser. The distributor structure (12, 20) comprises a channel structure (48) that interacts with at least (Continued)

one polymer membrane (16). The distributor structure (12, 20) is designed as a plastic part (40) that has electrically conductive properties.

20 Claims, 4 Drawing Sheets

(51) Int. Cl.
  *C25B 9/07* (2021.01)
  *C25B 9/77* (2021.01)
  *H01M 8/0226* (2016.01)
  *H01M 8/10* (2016.01)

(56) References Cited

U.S. PATENT DOCUMENTS

| | | | | |
|---|---|---|---|---|
| 2004/0023095 | A1* | 2/2004 | Middelman | H01M 8/0247 |
| | | | | 429/492 |
| 2005/0058878 | A1* | 3/2005 | Martin | H01M 8/2404 |
| | | | | 264/328.17 |
| 2005/0221139 | A1* | 10/2005 | Hampden-Smith | ............ |
| | | | | H01M 8/1048 |
| | | | | 429/535 |
| 2009/0136823 | A1* | 5/2009 | Kusakabe | H01M 8/0276 |
| | | | | 429/434 |
| 2011/0076590 | A1* | 3/2011 | Kozakai | H01M 8/0258 |
| | | | | 429/480 |
| 2012/0021329 | A1 | 1/2012 | Yamauchi et al. | |
| 2014/0356747 | A1* | 12/2014 | Gao | H01M 8/0258 |
| | | | | 429/434 |
| 2017/0077527 | A1* | 3/2017 | Imamura | H01M 8/0247 |
| 2017/0200957 | A1* | 7/2017 | Farrington | H01M 8/0258 |
| 2020/0343564 | A1* | 10/2020 | Berner | B21D 13/00 |

FOREIGN PATENT DOCUMENTS

| | | | | |
|---|---|---|---|---|
| DE | 102004039115 A1 * | 3/2005 | | C25B 11/02 |
| DE | 102012024753 A1 | 6/2014 | | |
| DE | 102013108413 A1 | 2/2015 | | |
| EP | 1437780 A2 | 7/2004 | | |
| EP | 1653543 A2 * | 5/2006 | | H01M 8/0258 |
| JP | 2017525109 A | 8/2017 | | |
| WO | 0215311 A2 | 2/2002 | | |
| WO | WO-2005056880 A1 * | 6/2005 | | C25B 9/04 |
| WO | 2009033648 A1 | 3/2009 | | |
| WO | WO-2011142745 A1 * | 11/2011 | | H01M 8/0254 |

OTHER PUBLICATIONS

Abstract Translation of DE 102004039115 A1 (Year: 2005).*
International Search Report for Application No. PCT/EP2019/082830 dated Feb. 17, 2020 (English translation, 2 pages).

* cited by examiner

DISTRIBUTOR STRUCTURE FOR A FUEL CELL OR ELECTROLYSER

BACKGROUND OF THE INVENTION

The present invention relates to a distributor structure for a fuel cell or an electrolyser and to the use of the distributor structure.

Fuel cells and electrolysers are electrochemical energy converters. In fuel cells, hydrogen (H2) and oxygen (O2) are converted into water (H2O), electrical energy and heat for energy production. In electrolysers, on the other hand, water is split into H2 and O2 by means of electric current. In polymer electrolyte fuel cells, the prevailing operating temperatures are below 120° C. Their construction is identical to that of electrolysers as regards the basic structure. However, electrolysers do not use a cooling channel. A PEM fuel cell (polymer electrolyte fuel cell) essentially has 5 components. The proton-conductive polymer membrane is embedded between 2 gas diffusion layers of microporous graphite paper or graphite fabric. Either the membrane or the two gas diffusion layers are coated with catalyst material on the contact surfaces. Bipolar plates are located on both sides outside the gas diffusion layers. A stack or a repeating unit of this construction is also referred to as a stack in German.

The bipolar plates used perform various functions and serve as a distributor structure. The bipolar plates distribute reaction gases uniformly over the active area and conduct electrons from the gas diffusion layers into the next cell. Liquid water or water vapor produced as a reaction product, and product gases from the cell, are carried away. Furthermore, heat is dissipated from the catalyst layer into coolant. The microporous gas diffusion layers, typically made hydrophobic by suitable coating, perform fine distribution and supply of the medium to the membrane or the removal of product water from the membrane into the structure of the bipolar plates.

In order to ensure the distribution of the operating media with a pressure loss and at no greater cost, a bipolar plate is typically produced by stamping a channel structure into a metal sheet approximately 0.1 mm thick. Here, the channel and web widths or, in general, the structure sizes are in the order of 1 to 2 mm.

DE 10 2004 039 115 A1 disclosed a bipolar plate for PEM fuel cells or PEM electrolysers. The shape of the bipolar plate is substantially conical, it being possible for the base surfaces of the cone to consist of any n-angles or circles and for the lateral surfaces to be straight or to be curved inward, outward or inward and outward. The flow channels can be arranged rectilinearly or helically along the lateral surface in any desired number and cross-sectional shape. The electrical supply and discharge take place via the bipolar plate itself or alternatively via metallic supply or discharge lines.

WO 2009/033648 A1 discloses a bipolar plate for a PEM electrolyser. The bipolar plate first of all has a region and an edge region surrounding the central region. The bipolar plate has two mutually opposite sides, which represent its plate surfaces, for example as front and rear sides. In this case, the central region and the edge region contain the entire part of the plate between the two mutually opposite sides.

DE 10 2012 024 753 A1 discloses a frame with an integrated bipolar plate for electrochemical reactors. One or more electrically conductive bipolar plates made of a thermoplastically deformable carbon-polymer composite material in a mold with a likewise thermoplastic polymer are overmolded by injection or compression molding in such a way that a positive and nonpositive and/or at least liquid-tight connection to form a single component consisting of frame and plate is produced.

SUMMARY OF THE INVENTION

According to the invention, the proposal is for a distributor structure, in particular a bipolar plate for a stack structure of a fuel cell or of an electrolyser, having a channel structure that interacts with at least one polymer membrane. The distributor structure is embodied as an injection-molded part that has electrically conductive properties. The injection-molded part can be produced in any desired design geometry and comprises a channel structure which touches one side of the polymer membrane with a minimum number of contact points.

Advantageously, the distributor structure proposed according to the invention is designed as an insert into a carrier of strip-shaped design and is, in particular, accommodated in a partition plate.

Pursuing the solution proposed according to the invention further, it is possible either for the distributor structure, configured as an injection-molded part, to be injection-molded from a graphite-plastic material mixture as an injection-molded part, or for the injection-molded part to be injection-molded from plastic material which is provided with an electrically conductive coating.

The distributor structure proposed according to the invention, designed as an injection-molded part, has a channel structure on its side facing the polymer membrane. The channel structure is also referred to as a flow field and may also have individual raised tips.

In the distributor structure proposed according to the invention, the channel structure comprises a number of small contact points that contact an underside of a polymer membrane or an upper side of a polymer membrane. These contact the polymer membrane via very small contact surfaces in order to be able to better apply the process water produced. The contact points have an area which is in the order of between 0.1 mm$^2$ and 1 mm$^2$. In the distributor structures that are currently used, in particular in the case of bipolar plates that are currently used, the channel structures simultaneously represent the contacting feature and have a width of 1 mm. Channel structures currently produced, which are produced by forming processes, cannot form such small contact surfaces.

In a further development of the distributor structure proposed according to the invention, the injection-molded part comprises a bearing surface, by means of which the injection-molded part is received on a base of the carrier, in particular of a partition plate. The partition plate forms a reliable seal against the cooling fluid flow in the event that the injection-molded part is not sufficiently leaktight. Furthermore, the partition plate has the function of reducing the electrical resistance, since this partition plate can be joined, in particular welded, to a further plate in a materially bonded manner. Alternatively, it is possible to design the entire arrangement as an injection-molded part and to connect a second arrangement to the injection-molded part by means of a connecting step.

In the distributor structure proposed according to the invention, configured as an injection-molded part, a circumferential seal sealing off the injection-molded part from the polymer membrane is molded onto the distributor structure. There is the possibility of attaching the seal to various components, for example to the partition plate or to the injection-molded part. In the context of the 2-component injection-molding process, the seal can already be molded on as part of this operation. In addition to the production of the seal by means of the 2-component injection-molding process on the injection-molded part, there is of course also the possibility of attaching the seal to the inserted partition plate.

In a further embodiment of the bipolar plate, the contact points are embodied in an optimized flow geometry, for example in the form of droplets. In addition to a configuration of the contact points in the form of droplets, it is also possible to embody them in other geometries, for example conical.

The invention furthermore relates to the use of the distributor structure within a stack structure of a fuel cell having a polymer membrane which is conductive for protons or hydroxide.

The present invention further relates to the use of the distributor structure as claimed in any of the preceding claims in the stack structure of an electrolyser having a polymer membrane which is conductive for protons or hydroxide.

The distributor structure proposed according to the invention, in particular a bipolar plate embodied as a plastic injection-molded part, can be injection-molded in a large number of variations. A channel structure of the injection-molded part can be optimized in such a way that small points of support can be achieved by means of the injection-molded shaping in order to increase power density, since blockage by process water can be avoided and, in addition, the pressure loss can be considerably reduced.

The small points of support reduce the area within which process water could accumulate during operation of the stack structure, whether as a fuel cell or as an electrolyser. Accumulations of process water adversely affect the active area of the polymer membrane and thus the overall efficiency of the stack structure—whether within a fuel cell or within an electrolyser.

Furthermore, the flow design of the channel structure can be configured in an optimum way by the method of plastic injection molding.

By virtue of the optimized configuration of the distributor structure, a slight pressure loss is to be expected. For example, the production method enables the distributor structure proposed according to the invention to be embodied as a complete plastic component to which seals can, for example, be molded as part of the process, thus enabling additional operations to be eliminated. If the electrical conductivity is too low, this property can be optimized by an appropriate surface coating.

By means of a minimum of contact points between the channel structure, the number of contact points, i.e. the number of contacts with a polymer membrane, can be reduced to such an extent that the polymer membrane has sufficient points of support or the electrical resistance does not increase excessively. The number of contact points depends on the transverse conduction in the polymer membrane. Furthermore, the tips of the channel structure, i.e. the small contact points of the injection-molded part with the polymer membrane, can advantageously be formed in a flow-optimal contour. A flow-optimal contour of the small contact points is, for example, a droplet shape in which the small contact points can be formed in the cathode path, for example. As a result, the pressure loss can be minimized and the overall efficiency of the stack structure, whether as a fuel cell or as an electrolyser, can be considerably improved.

The electrical conductivity is realized by the material of the injection-molded part, which can be made electrically conductive by adding fillers, for example. For example, the injection-molded part can be formed from a graphite-plastic material compound. In the event that the electrical resistance is too high, the plastic material can additionally or exclusively be coated with a metallic material.

In the distributor structure proposed according to the invention, in particular bipolar plate, the channel structure can be produced as a plastic compound as an insert or as a complete bipolar plate.

Overall, the distributor structure proposed according to the invention, in particular embodied as a bipolar plate, considerably improves the water discharge and allows more design freedom for the optimization of flow losses. Since the component is a plastic compound, corrosion resistance is considerably improved. Furthermore, the sealing function can be integrated into the component, in particular by using 2-component injection molding or a compound, appropriate stocks of which are to be held.

BRIEF DESCRIPTION OF THE DRAWINGS

The invention is described in greater detail below with reference to the drawings.

In the drawings.

DETAILED DESCRIPTION

Figure 1:
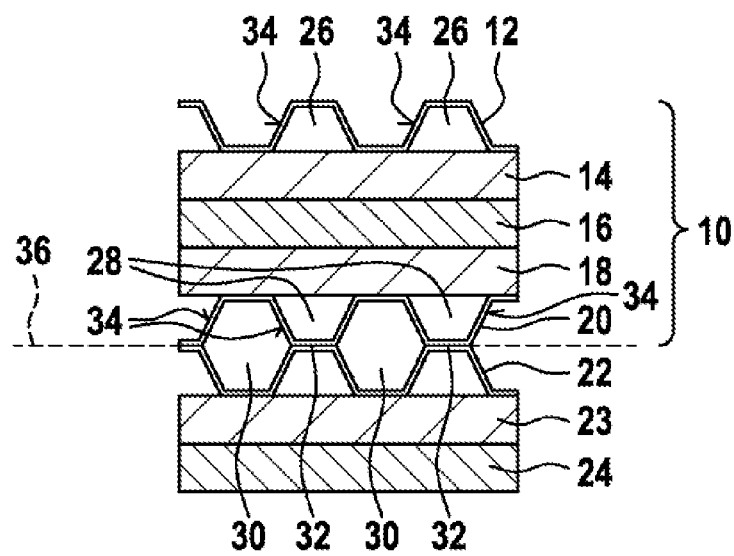
FIG. 1 shows a schematic diagram of a stack structure for a fuel cell or an electrolyser.

The illustration according to FIG. 1 is a schematic diagram of a stack structure 10 for use within a fuel cell or an electrolyser.

A stack structure 10 according to the illustration in FIG. 1 comprises a first distributor structure 12, in particular a bipolar plate, and a first gas diffusion layer 14. A polymer membrane 16 is situated below the first gas diffusion layer 14, within the stack structure 10. In addition, the stack structure 10 comprises a second gas diffusion layer 18 and a second distributor structure 20, in particular a second bipolar plate. These 5 layers essentially make up the stack structure 10, which can be used both in the context of a fuel cell and in the context of an electrolyser. While in fuel cells hydrogen H2 and oxygen O2 are converted into water H2O, electrical energy and heat for energy production, within an electrolyser water is decomposed into H2 and O2 by means of electric current.

FIG. 1 shows the stack structure 10, which can be extended to form a stack if the stack structure 10 is repeated.

The illustration according to FIG. 1 furthermore shows an imaginary dividing line 36 above which the stack structure 10 consisting of the five components mentioned above is situated.

As FIG. 1 furthermore shows, flow channels 26 for O2 are formed within the first distributor structure 12, as well as cooling channels for a cooling medium, e.g. H2O. Similarly, at the lower end of the stack structure 10 above the imaginary stack boundary 36, there are flow channels 28 for gaseous H2 and flow channels 30 for receiving cooling medium, for example H2O, in a second distributor structure 20, in particular a second bipolar plate. For the sake of completeness, it may be mentioned that the stack structure 10 is mounted along contact surfaces 32 on a further distributor structure 22 of a further stack structure, not shown completely here, having a further gas diffusion system 23 and a further polymer membrane 24. The flow channels 26, 28, 30 for the various media are delimited by wall surfaces 34.

Figure 2:
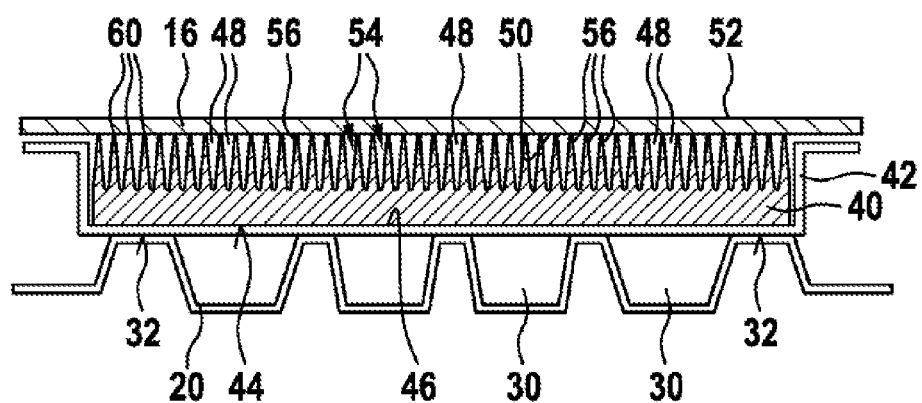
FIG. 2 shows a distributor structure, for example a bipolar plate, manufactured as an injection-molding insert.

The illustration according to FIG. 2 shows an embodiment variant of a distributor structure 20 manufactured as a plastic part.

As FIG. 2 shows, in this embodiment variant, the first distributor structure 12 or the second distributor structure 20 is manufactured as a plastic part 40. The plastic part 40 may be one which is injection-molded from a graphite-plastic-material-compound mixture and already has electrically conductive properties as a result of the plastic component composition. On the other hand, there is also the possibility of producing the plastic part 40 from a plastic material and then coating the latter with an electrically conductive coating 38, for example a metallic coating.

The plastic part 40 shown in FIG. 2 is mounted on a carrier, for example a partition plate 42, which essentially has a trough shape. By means of a bearing surface 44 of the plastic part 40, the latter is mounted on a base 46 of the carrier, in particular of the partition plate 42, or is simply inserted into the latter.

The plastic part 40 has a channel structure 48, or a flow field, which replaces the channels of the channel structure 48. The channel structure 48, which is formed on a side 54 of the plastic part 40 which faces the polymer membrane 16, has a number of conical tips 56, at the ends of which there are small contact points 60. The small contact points 60 of the channel structure 48 have a contact surface which can be from 0.1 mm$^2$ to 1 mm$^2$, enabling surface contact to be established with the underside 50 of the polymer membrane 16. The individual tips 56 of the channel structure 48 on the plastic part 40, which are, for example, of conical design, can be coated with an electrically conductive coating 38, as indicated in a greatly enlarged representation in FIG. 4.

The channel structure 48 of the plastic part 40 is in contact with an underside 50 of the polymer membrane 16 on its side 54 facing the polymer membrane 16. An upper side of the polymer membrane 16 is identified by reference sign 52. The tips 56 of the channel structure 48 terminate in the small contact points 60, the number of which is minimized. The small contact points 60 preferably have a contact surface which is in the order of between 0.1 mm$^2$ and 1 mm$^2$. The number and size of the small contact points 60 reduce the area under which process water could accumulate during operation of the stack structure 10, which reduces the active area of the polymer membrane 16 and thus reduces the overall efficiency of the stack structure 10, whether it is used in a fuel cell or in an electrolyser. The reduction is mainly due to the reduction of the active area.

The number of small contact points 60 can be reduced to an extent such that the polymer membrane 16 has sufficient points of support and the electrical resistance does not become excessive. The small contact points 60 of the tips 56 of the channel structure 48 can be formed, for example, in the cathode path in a flow-optimal structure, for example in droplet form 58. As a result, the pressure loss in the stack structure 10 can be reduced and hence the overall efficiency of the stack structure 10, whether in a fuel cell or in an electrolyser, can be considerably improved.

The illustration according to FIG. 2 furthermore shows that there are flow channels 30 for product water under the base 46 of the carrier, which is, in particular, designed as a partition plate 42. FIG. 2 furthermore shows that the carrier, designed, in particular, as a partition plate 42, rests on contact surfaces 32 of the second distributor structure 20 illustrated in FIG. 2, in particular a bipolar plate.

Figure 3:
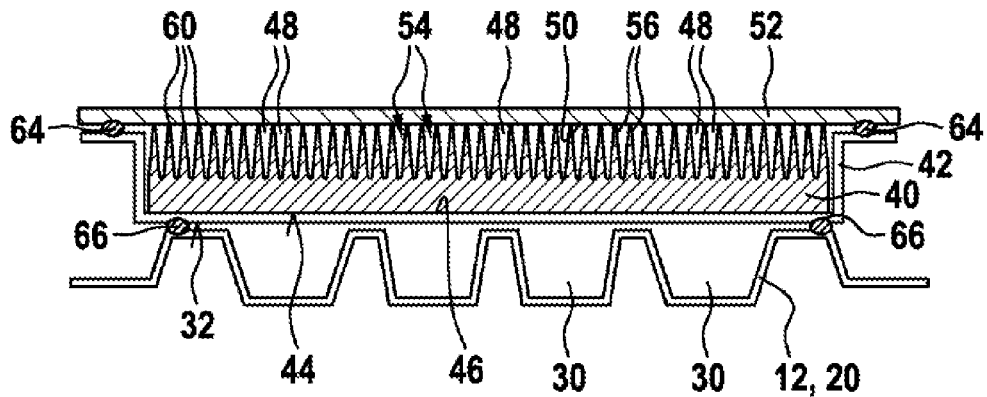
FIG. 3 shows a distributor structure, in particular a bipolar plate as an injection-molded component with an integrally molded seal.

The illustration according to FIG. 3 is a further possible embodiment of the plastic part 40 serving as a distributor structure 12, 20, in particular as a bipolar plate.

In the possible embodiment of the plastic part 40 shown in FIG. 3, the latter is provided with a seal 64 which is, for example, of circumferential design and which, during the production of the plastic part 40, can be molded onto the latter, for example.

The channel structure 48 comprises individual, for example conical tips 56, at the ends of which small contact points 60 are formed. The number of small contact points 60 is selected so that, on the one hand, a minimum of the small contact points 60 is present and, on the other hand, the polymer membrane 16 still has sufficient points of support to make contact with the plastic part 40.

The illustration according to FIG. 3 furthermore shows a seal 66. By means of the seal 66, which is situated at the sides of the base 46 of the carrier, designed, in particular, as a partition plate 42, the carrier is sealed off from the distributor structure 12, 20 situated underneath, in particular a bipolar plate. The carrier designed, in particular, as a partition plate 42 rests on individual contact surfaces 32 of the second distributor structure 20, in particular a bipolar plate, arranged beneath the carrier designed as a partition plate 42. The flow channels 30 for product water that is formed run in said distributor structure.

The circumferential seal 64 shown in the illustration according to FIG. 3 or the seal 66 for the first or second distributor structure 12, 20, in particular bipolar plate, can be produced directly during the production of the plastic part 40 by the 2-component injection molding process, and therefore additional operations for the production of the circumferential seal 64 or of the seal 66 for the first or second distributor structure 12, 20, in particular bipolar plate, are unnecessary.

With respect to the plastic part 40, its electrical conductivity is produced by the selected material mix of graphite and plastic, and in this case the electrical conductivity is achieved by adding graphite. In the event that the electrical resistance is too high, the plastic material could additionally or exclusively be coated with a metallic material, depending on the electrical resistance requirements.

Figure 4:
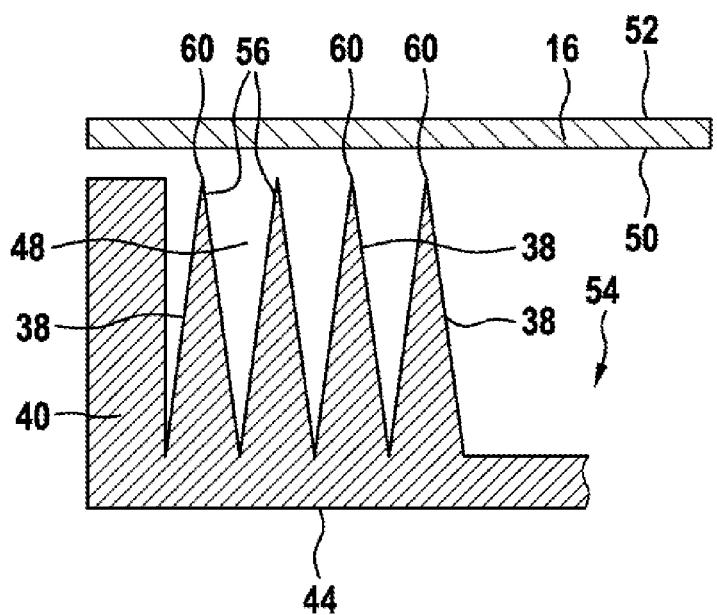
FIG. 4 shows an enlarged illustration of the plastic part.

The greatly enlarged illustration according to FIG. 4 shows that the plastic part 40 has the channel structure 48, which is essentially provided by an arbitrary sequence of tips 56, e.g. conical tips. The side 54 of the plastic part 40 which faces the polymer membrane 16, in particular the tips 56 of the channel structure 48, can be provided with an electrically conductive coating 38, in particular a metallic coating, for influencing the electrical resistance, as shown in the greatly enlarged illustration according to FIG. 4. The polymer membrane 16 has the underside 50 and the upper side 52, wherein the underside 50 of the polymer membrane 16 faces the side 54 of the plastic part 40 which faces the polymer membrane.

Figure 5:
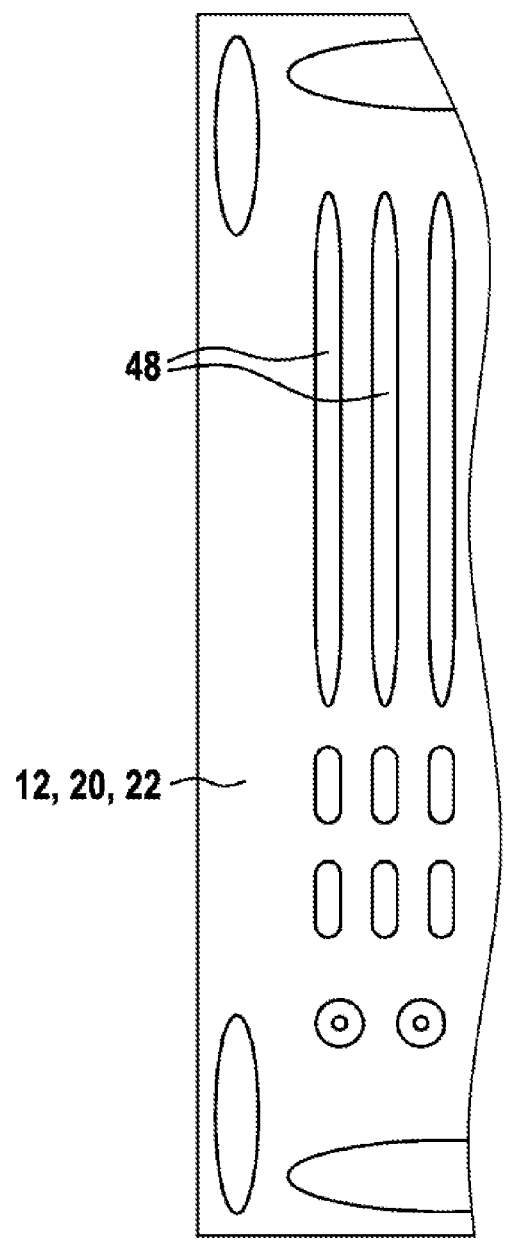
FIGS. 5 and 6 show details of the distributor structure.
Figure 6:
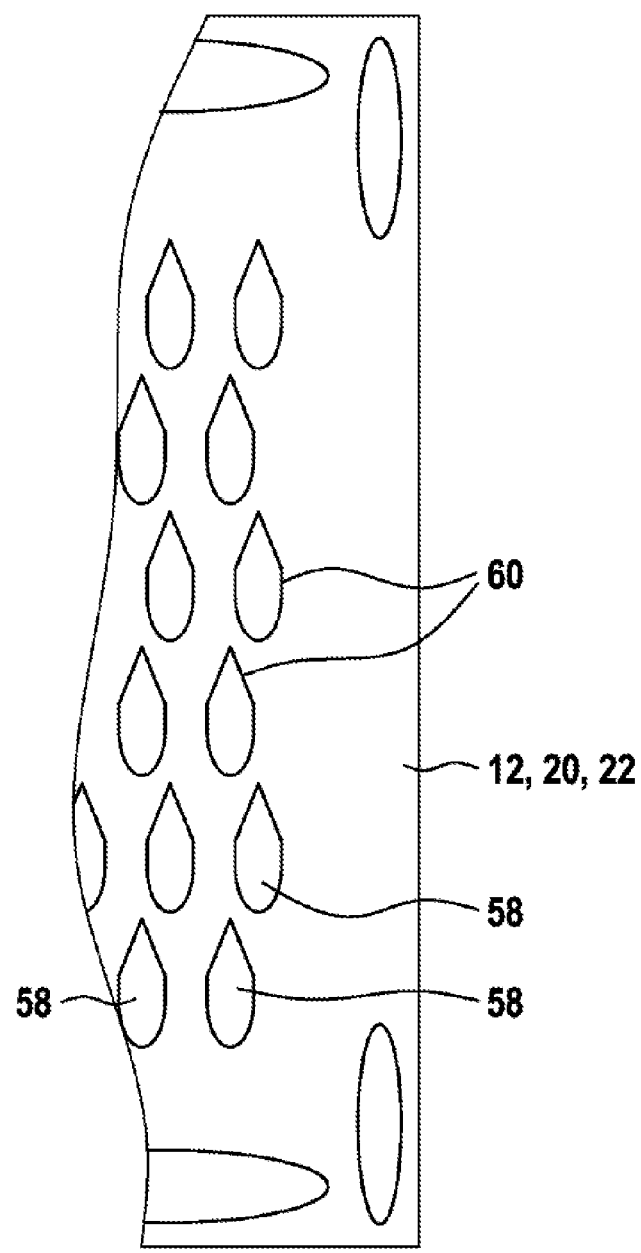

FIGS. 5 and 6 show details of distributor structures 12, 20, 22, in particular of bipolar plates. As can be seen, for example, from FIG. 5, the channel structure 48 can be formed from a number of channels extending substantially parallel to one another. Furthermore, the channel structure 48 can comprise knob-shaped elevations, likewise schematically indicated in FIG. 5. It is apparent from the sectional illustration according to FIG. 6 that the small contact points 60 (shown here in a greatly enlarged illustration) have a droplet shape 58, which is particularly favorable in terms of flow. In comparison with the surfaces of the distributor structures 12, 20, 22 shown in FIGS. 5 and 6, both the channel structure 48, the knobs and the contact points 60 in droplet form 58 are shown in greatly enlarged representation.

The invention is not restricted to the illustrative embodiments described here or to the aspects emphasized herein. On the contrary, a large number of modifications that lie within the scope of action of a person skilled in the art is possible within the range indicated by the claims.

What is claimed is:

1. A distributor structure (12, 20) for a fuel cell, the distributor structure (12, 20) having a channel structure (48) that interacts with at least one polymer membrane (16) of the fuel cell, wherein the distributor structure (12, 20) is embodied as a plastic part (40) that has electrically conductive properties,
    wherein the plastic part (40) has a channel structure (48) on a side (54) facing the polymer membrane (16),
    wherein the channel structure (48) has a number of contact points (60) that contact an underside (50) of a polymer membrane (16) or an upper side (52) of a polymer membrane (16), and
    wherein each contact point (60) is on a conical tip of the channel structure (48) such that the channel structure (48) tapers from a wider thickness to a narrower thickness as the channel structure approaches respective contact points (60),
    wherein a contact surface area of each of the contact points (60) is between 0.1 mm$^2$ and 1 mm$^2$.

2. The distributor structure (12, 20) as claimed in claim 1, wherein the distributor structure is an insert in a trough-shaped carrier.

3. The distributor structure (12, 20) as claimed in claim 2, wherein the plastic part (40) has a bearing surface (44) on which the plastic part is received on a base (46) of the carrier.

4. The distributor structure (12, 20) as claimed in claim 1, wherein the plastic part (40) is injection-molded from a graphite-plastic material mixture.

5. The distributor structure (12, 20) as claimed in claim 1, wherein the plastic part (40) has at least one circumferential seal (64) which seals the plastic part with respect to the polymer membrane (16).

6. The distributor structure (12, 20) as claimed in claim 1, wherein the contact points (60) are embodied in droplet form (58) or in conical form.

7. A stack structure (10) of a fuel cell having a polymer membrane (16) which is conductive for protons or hydroxide, the stack structure comprising the distributor structure (12, 20) as claimed in claim 1.

8. A stack structure (10) of an electrolyser having a polymer membrane (16) which is conductive for protons or hydroxide, the stack structure comprising the distributor structure (12, 20) as claimed in claim 1.

9. The distributor structure (12, 20) as claimed in claim 1, wherein the distributor structure is an insert in a partition plate (42).

10. The distributor structure (12, 20) as claimed in claim 1, wherein the plastic part (40) is injection-molded from plastic material which is provided with an electrically conductive coating (38).

11. The distributor structure (12, 20) as claimed in claim 1, wherein the plastic part (40) has a bearing surface (44) on which the plastic part is received on a partition plate (42).

12. The distributor structure (12, 20) as claimed in claim 1, wherein the distributor structure is a bipolar plate for a stack structure (10) of a fuel cell or of an electrolyser.

13. A stack structure (10) of a fuel cell having a polymer membrane (16) which is conductive for protons or hydroxide, the stack structure comprising:
    a trough-shaped carrier, and
    the distributor structure as claimed in claim 1, wherein the distributor structure is an insert positioned in the trough-shaped carrier.

14. A distributor structure (12, 20) for a fuel cell, the distributor structure (12, 20) having a channel structure (48) that interacts with at least one polymer membrane (16) of the fuel cell, wherein the distributor structure (12, 20) is embodied as a plastic part (40) that has electrically conductive properties,
    wherein the plastic part (40) has a channel structure (48) on a side (54) facing the polymer membrane (16),
    wherein the channel structure (48) has a number of contact points (60) that contact an underside (50) of a polymer membrane (16) or an upper side (52) of a polymer membrane (16), and
    wherein each contact point (60) is on a conical tip of the channel structure (48) such that the channel structure (48) tapers from a wider thickness to a narrower thickness as the channel structure approaches respective contact points (60),
    wherein the contact points (60) are embodied in droplet form (58) or in conical form.

15. The distributor structure (12, 20) as claimed in claim 14, wherein the distributor structure is an insert in a trough-shaped carrier.

16. The distributor structure (12, 20) as claimed in claim 15, wherein the plastic part (40) has a bearing surface (44) on which the plastic part is received on a base (46) of the carrier.

17. The distributor structure (12, 20) as claimed in claim 14, wherein the plastic part (40) is injection-molded from a graphite-plastic material mixture.

18. The distributor structure (12, 20) as claimed in claim 14, the plastic part (40) has at least one circumferential seal (64) which seals the plastic part with respect to the polymer membrane (16).

19. The distributor structure (12, 20) as claimed in claim 14, wherein the distributor structure is an insert in a partition plate (42).

20. The distributor structure (12, 20) as claimed in claim 14, wherein the plastic part (40) has a bearing surface (44) on which the plastic part is received on a partition plate (42).

* * * * *